US012728758B2

(12) United States Patent
Hassani et al.

(10) Patent No.: US 12,728,758 B2
(45) Date of Patent: Sep. 8, 2026

(54) SYSTEM AND METHOD FOR OPTIMIZING ELECTRIC VEHICLE CHARGE TIME

(71) Applicant: Ford Global Technologies, LLC, Dearborn, MI (US)

(72) Inventors: Ali Hassani, Ann Arbor, MI (US); Alexandra Taylor, Harbor Springs, MI (US); John Robert Van Wiemeersch, Novi, MI (US)

( * ) Notice: Subject to any disclaimer, the term of this patent is extended or adjusted under 35 U.S.C. 154(b) by 759 days.

(21) Appl. No.: 18/159,160

(22) Filed: Jan. 25, 2023

(65) Prior Publication Data

US 2024/0246446 A1 Jul. 25, 2024

(51) Int. Cl.

| | |
|---|---|
| ***H02J 7/00*** | (2026.01) |
| ***B60L 53/64*** | (2019.01) |
| ***B60L 53/66*** | (2019.01) |
| ***B60L 53/68*** | (2019.01) |
| ***H02J 7/14*** | (2006.01) |

(52) U.S. Cl.

CPC ............... *B60L 53/68* (2019.02); *B60L 53/64* (2019.02); *B60L 53/665* (2019.02); *B60L 2240/72* (2013.01)

(58) Field of Classification Search

CPC ......... B60L 53/64; B60L 53/665; B60L 53/68
USPC .......................................................... 320/132
See application file for complete search history.

(56) References Cited

U.S. PATENT DOCUMENTS

| | | | | |
|---|---|---|---|---|
| 9,026,347 | B2 | 5/2015 | Gadh et al. | |
| 10,025,277 | B2 | 7/2018 | Miftakhov et al. | |
| 10,071,643 | B2 | 9/2018 | Penilla et al. | |
| 10,843,580 | B2 | 11/2020 | Pollack et al. | |
| 12,409,751 | B2 * | 9/2025 | Kiessling | B60L 53/62 |
| 2011/0130885 | A1 * | 6/2011 | Bowen | B60L 3/12 700/291 |
| 2011/0193522 | A1 * | 8/2011 | Uesugi | G07F 15/005 320/109 |
| 2013/0179061 | A1 * | 7/2013 | Gadh | B60L 53/67 701/1 |

(Continued)

OTHER PUBLICATIONS

Tianyang Zhang et al., User Demand Prediction and Cloud-Based Smart Mobile Interface for Electric Vehicle Charging, 2016 IEEE PES Asia-Pacific, Oct. 25-28, 2016.

*Primary Examiner* — Alexis B Pacheco
(74) *Attorney, Agent, or Firm* — Emily Campbell; Eversheds Sutherland (US) LLP

(57) ABSTRACT

A vehicle charger optimization system is disclosed. The system may include a transceiver configured to receive charging information from a vehicle. The charging information may include a real-time charging rate at which the vehicle may be getting charged using a charger. The system may further include a memory configured to store a projected charging rate associated with the charger. The system may further include a processor configured to obtain the projected charging rate and the real-time charging rate and calculate a first difference between the projected charging rate and the real-time charging rate. The processor may determine that the first difference is greater than a first predefined threshold, and perform a predetermined action based on a determination that the first difference is greater than the first predefined threshold. The predefined action may include transmitting a maintenance flag to a server or a third-party entity that manages the charger.

18 Claims, 5 Drawing Sheets

(56) References Cited

U.S. PATENT DOCUMENTS

| | | | | |
|---|---|---|---|---|
| 2020/0022103 | A1* | 1/2020 | Kim | G01S 5/0263 |
| 2020/0111175 | A1* | 4/2020 | Uyeki | G06Q 10/06312 |
| 2020/0324667 | A1* | 10/2020 | Yaldo | B60L 58/12 |
| 2021/0101504 | A1* | 4/2021 | Okamoto | B60L 58/25 |
| 2021/0252993 | A1* | 8/2021 | Kinomura | B60L 53/68 |
| 2022/0050143 | A1* | 2/2022 | Maeda | G01R 31/382 |
| 2022/0051568 | A1* | 2/2022 | Kessler | G06Q 10/063 |
| 2023/0024900 | A1* | 1/2023 | Ayoola | B60L 55/00 |
| 2023/0271521 | A1* | 8/2023 | Jiang | B60L 58/13<br>320/109 |
| 2023/0408273 | A1* | 12/2023 | Dow | B60L 53/665 |
| 2024/0034184 | A1* | 2/2024 | Al Gafri | B60L 53/67 |
| 2024/0140239 | A1* | 5/2024 | Anand | B60L 53/305 |
| 2024/0149719 | A1* | 5/2024 | Ropel | B60L 53/305 |
| 2024/0157836 | A1* | 5/2024 | Galbraith | B60L 53/68 |
| 2024/0190286 | A1* | 6/2024 | King, Jr. | B60L 53/305 |
| 2025/0112476 | A1* | 4/2025 | Malik | B60L 53/60 |

* cited by examiner

SYSTEM AND METHOD FOR OPTIMIZING ELECTRIC VEHICLE CHARGE TIME

FIELD

The present disclosure relates to electric vehicles, and more particularly, to a system and method for optimizing electric vehicle charging time using third-party chargers.

BACKGROUND

As awareness of green technology is increasing, battery electric vehicles (BEVs) and plug-in hybrid electric vehicles are gaining popularity. An Electric Vehicle (EV) operates on electric energy, and a vehicle user is required to charge vehicle battery regularly to ensure uninterrupted vehicle operation.

While planning for a trip, the vehicle user may search for EV chargers along the trip route and may plan EV charging based on locations, tiers, etc. of chargers along the route. Conventional systems are available that provide charger information (e.g., location, tier, etc.) to the user, which may assist the user in planning the trip and identifying chargers to charge the EV. However, there may be instances where the chargers identified by the user may not be in working condition or may provide sub-optimal charging rates. Such instances may cause inconvenience to the user and may disrupt the user trip.

Thus, there is a need for a system and method that provides reliable charger information to the user.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
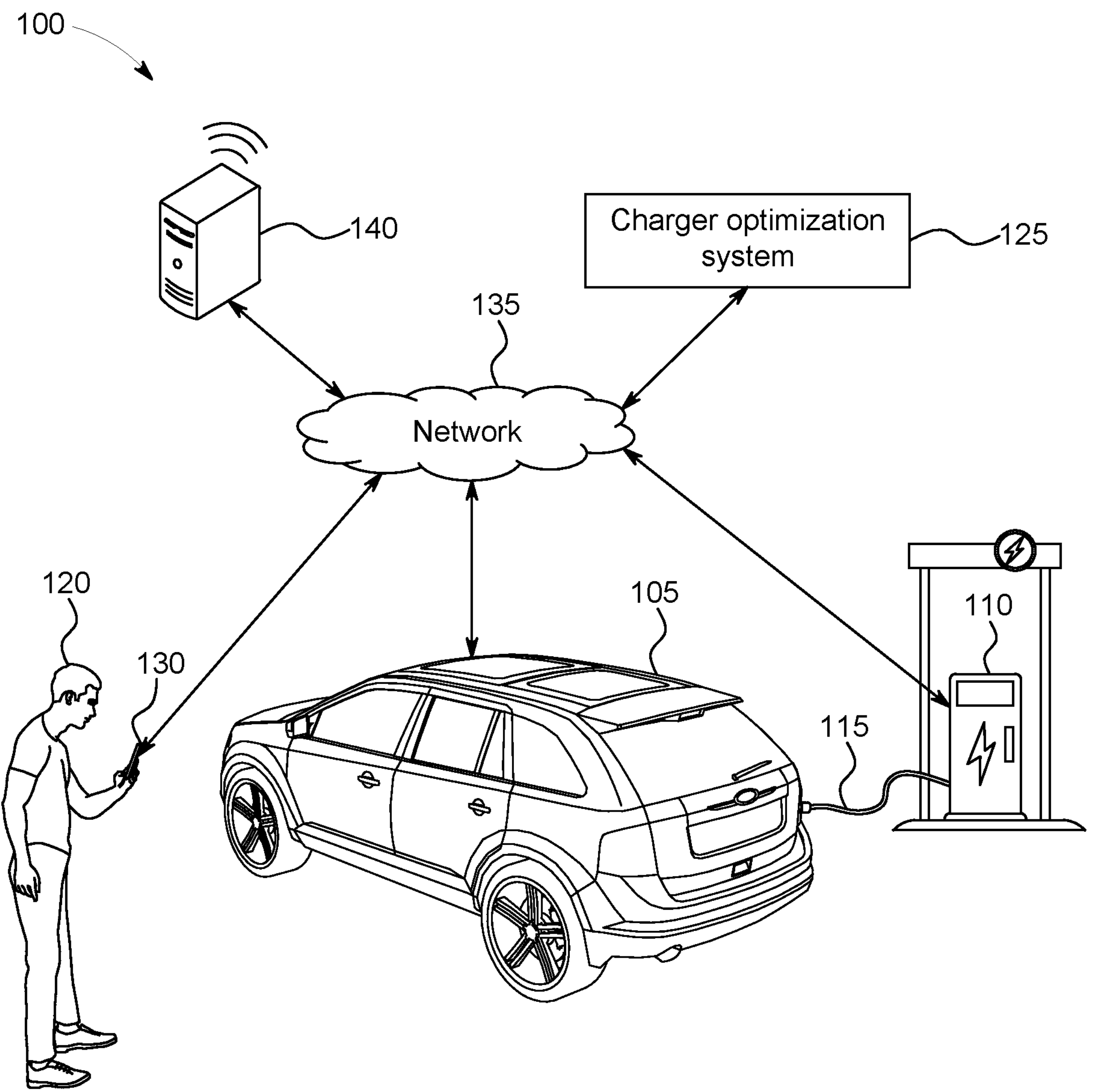
FIG. 1 depicts an example environment in which techniques and structures for providing the systems and methods disclosed herein may be implemented.

The present disclosure describes a vehicle charger optimization system and method. The system may be hosted on a server or cloud and may connect with a vehicle. The vehicle may be a Battery Electric Vehicle (BEV) that may connect with a charging station to charge the vehicle. The vehicle may determine a real-time charging rate at which the charging station may be charging the vehicle and may transmit the real-time charging rate to the system. In addition, the system may obtain a projected or "claimed" charging rate associated with the charging station from the charging station itself or a third-party entity that may manage charging station operation. The system may determine a difference between the real-time charging rate and the projected charging rate and may transmit a notification to the third-party entity and/or a vehicle user device when the difference is greater than a threshold. In some aspects, the system may determine that the charging station may require repair when the difference is greater than the threshold, and the notification may be a maintenance flag.

In additional aspects, the system may store the real-time charging rate in a system memory and may transmit the real-time charging rate to one or more users who may access the system to obtain charging rate information associated with the charging station.

The system may be further configured to determine whether the charging station may be over-billing to vehicle users. Specifically, the system may obtain an actual charge time duration from the vehicle along with the real-time charging rate and calculate an actual energy that may be transferred by the charging station to the vehicle. The system may further obtain a projected or claimed energy transferred to the vehicle from the charging station and/or the third-party entity, for which the vehicle user may have been billed. The system may calculate a difference between the actual energy transferred and the projected energy transferred and may send an over-billing or a fraud notification to the vehicle user device, the third-party entity and/or authorities when the difference is greater than a predefined threshold.

The system may additionally determine standard charging time associated with the charging station based on the real-time charging rate and a vehicle type information associated with the vehicle. The system may transmit standard charging time information to users who may request for such standard charging time information associated with the charging station.

The present disclosure discloses a vehicle charger optimization system and method that provides accurate and reliable charging performance or behavior information associated with a charging station. Since the system "crowdsources" real-time charging rate information from vehicles that use the charging station, the charging rate information is accurate and up to date. Further, the system assists in determining charging stations that may require repair or maintenance. Furthermore, the system assists in determining charging stations that may be, inadvertently or intentionally, over-billing users for using the charging stations. Thus, the system may additionally assist in detecting fraud.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be a battery electric vehicle (BEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. In further aspects, the vehicle 105 may be a plug-in hybrid electric vehicle (PHEV). When the vehicle 105 is PHEV, the vehicle 105 may be equipped with an internal combustion engine that can be employed either alone or in combination with other energy sources to propel the vehicle 105.

The vehicle 105 may include a traction battery or battery pack (not shown) that may provide energy for vehicle propulsion. The battery may be charged by an external power source 110. The external power source 110 may be a charging point (hereinafter referred to as a charging station 110). The charging station 110 may include a connecting device 115 that may connect the charging station 110 and the vehicle 105. The connecting device 115 may include a cable and a cable connector that may be inserted in the vehicle 105 for charging. In particular, when a vehicle user 120 desires to charge the vehicle 105, the user 120 may insert the cable connector in the vehicle 105.

In some aspects, the charging station 110 may be publicly available electrified vehicle charging station that may belong to a third-party. The charging station 110 may be configured to supply alternating current (AC) power or supply direct current (DC) power. The DC power may enable fast charging of vehicle battery. Stated another way, the DC power may provide sufficient charge to the vehicle battery in relatively short time duration (e.g., 50% in 10-15 minutes). In some aspects, the vehicle 105 may include power converters (not shown) such as AC to DC converter, DC to DC converter, etc. A person ordinarily skilled in the art may appreciate that the AC to DC converter may be used to convert AC power from the charging station 110 to DC power that may be supplied to the vehicle battery. Further, the DC-to-DC converter may be used to convert a first DC voltage to a second DC voltage for different vehicle functions.

The environment 100 may further include a charger optimization system 125 that may be connected to the vehicle 105 and a user device 130 associated with the user 120, via one or more networks 135. The network(s) 135 illustrates an example communication infrastructure in which the connected devices discussed in various embodiments of this disclosure may communicate. The network(s) 135 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples. The charger optimization system 125 may be further connected to a server 140, via the network 135. The server 140 may be associated with a third-party entity that may manage the charging station 110.

The charger optimization system 125 may be configured to receive charging information from the vehicle 105. The charging information may be associated with the charging station 110 that the user 120 may use to charge the vehicle 105. The charging information may include, for example, real-time charging rate at which the vehicle 105 is charged using the charging station 110. In particular, the vehicle 105 may determine the real-time charging rate when the user 120 connects the connecting device 115 to the vehicle 105 and initiates charging of the vehicle 105. Responsive to determining the real-time charging rate, the vehicle 105 may transmit the real-time charging information to the charger optimization system 125 via the network 135.

The charger optimization system 125 may further obtain a projected charging rate associated with the charging station 110. The projected charging rate may be "claimed" charging rate associated with the charging station 110, e.g., the charging rate that the charging station 110 may claim or project (e.g., 100 kW, 150 kW or 200 kW). In some aspects, the charger optimization system 125 may obtain the projected charging rate from a system memory (shown as memory 224 in FIG. 2) associated with the charger optimization system 125. In other aspects, the charger optimization system 125 may obtain the projected charging rate from the server 140 (or any other server/database) that may store projected charging rates for all chargers that the third-party entity may be managing.

In some scenarios, the real-time charging rate may be different from the projected charging rate. For example, the real-time charging rate may be 50-75% of the projected charging rate of the charging station 110 when charging performance may be low (for instance, when the charging station 110 requires maintenance or where the connecting device 115 is faulty). The charger optimization system 125 may obtain both the real-time charging rate and the projected charging rate, and may determine a first difference between the real-time charging rate and the projected charging rate.

The charger optimization system 125 may further determine that the first difference between the real-time charging rate and the projected charging rate may be greater than a first predefined threshold. Responsive to a determination that the first difference may be greater than the first predefined threshold, the charger optimization system 125 may perform a predefined action. For example, the charger optimization system 125 may report maintenance flag, and may transmit a notification to the server 140. The maintenance flag may indicate to the third-party entity that the charging station 110 may require repair.

In additional aspects, the charger optimization system 125 may store the real-time charging rate associated with the charging station 110 in the system memory. Further, the charger optimization system 125 may transmit the real-time charging rate to one or more user devices associated with the charger optimization system 125 so that users associated with the one or more user devices may be aware of the real-time charging rate (or actual charging rate) associated with the charging station 110. In this manner, the charger optimization system 125 may provide accurate and reliable charging rate information associated with chargers to the users, thus enhancing user convenience. The charger optimization system 125 may further obtain real-time charging rate information associated with a charging station (e.g., the charging station 110) from multiple user regularly to "crowdsource" accurate charging rate information, thus ensuring that the charging rate information is up-to-date.

In addition, the charger optimization system 125 may be configured to detect authenticity associated with the charging station 110. For example, the charger optimization system 125 may determine if the charging station 110 reports/projects more energy transferred than an actual energy transferred to the vehicle 105. In particular, the charger optimization system 125 may obtain an actual charge time duration from the vehicle 105 for which the vehicle 105 may be connected to the charging station 110. The charger optimization system 125 may then calculate the actual energy transferred to the vehicle 105 based on the actual charge time duration and the real-time charging rate. The charger optimization system 125 may further obtain the projected energy transferred to the vehicle 105 from the charging station 110 (specifically via the server 140 that may obtain projected energy transferred information from the charging station 110 and transmit the information to the charger optimization system 125). Responsive to obtaining the projected energy transferred and calculating the actual energy transferred, the charger optimization system 125 may determine a second difference between the actual energy transferred and the projected energy transferred. The charger optimization system 125 may further determine that the second difference may be greater than a second predefined threshold and may transmit another notification to the server 140 to report over-billing of energy to the user 120 or fraud. In some aspects, the charger optimization system 125 may additionally transmit the notification to the user device 130 and/or another server (that may belong to authorities, not shown), so that the user 120 and/or the authorities are aware of over-billing.

In further aspects, the charger optimization system 125 may be configured to determine "standard" or "expected" charging time duration associated with the charging station 110 for a particular vehicle type. In particular, the charger optimization system 125 may obtain a vehicle type (e.g., a first vehicle type) associated with the vehicle 105 from the vehicle 105 and may calculate an expected or standard charging time duration associated with the charging station 110 and the first vehicle type based on the real-time charging rate. The first vehicle type may be, for example, a vehicle model (e.g., Ford™ Mustang™ Mach-E™) of the vehicle 105. In this case, the standard charging time may indicate the expected time duration in which the charging station 110 may charge a Ford™ Mustang™ Mach-E™ vehicle.

The charger optimization system 125 may further store the standard charging time duration associated with the charging station 110 in the system memory. When the charger optimization system 125 receives a request from another user (e.g., a second vehicle user) enquiring about a standard charging time duration of the charging station 110, the charger optimization system 125 may determine a second vehicle type associated with a vehicle owned by the second vehicle user based on the request. Responsive to determining the second vehicle type, the charger optimization system 125 may determine whether the second vehicle type is same as the first vehicle type. Based on a determination that the second vehicle type is same as the first vehicle type, the charger optimization system 125 may fetch the standard charging time duration (as determined above) associated with the charging station 110 and the first vehicle type from the system memory and transmit the standard charge time duration to the second vehicle user (specifically to a user device associated with the second vehicle user). Further details of the charger optimization system 125 may be understood in conjunction with FIG. 2.

Although FIG. 1 (and subsequent figures in the present disclosure) is described in conjunction with EV charging, the present disclosure is not limited to charging of EVs and/or EV chargers. The present disclosure may be applied to gasoline, diesel, or alternative source (ethanol, hydrogen, etc.) based vehicle and chargers, without departing from the present disclosure scope.

Figure 2:
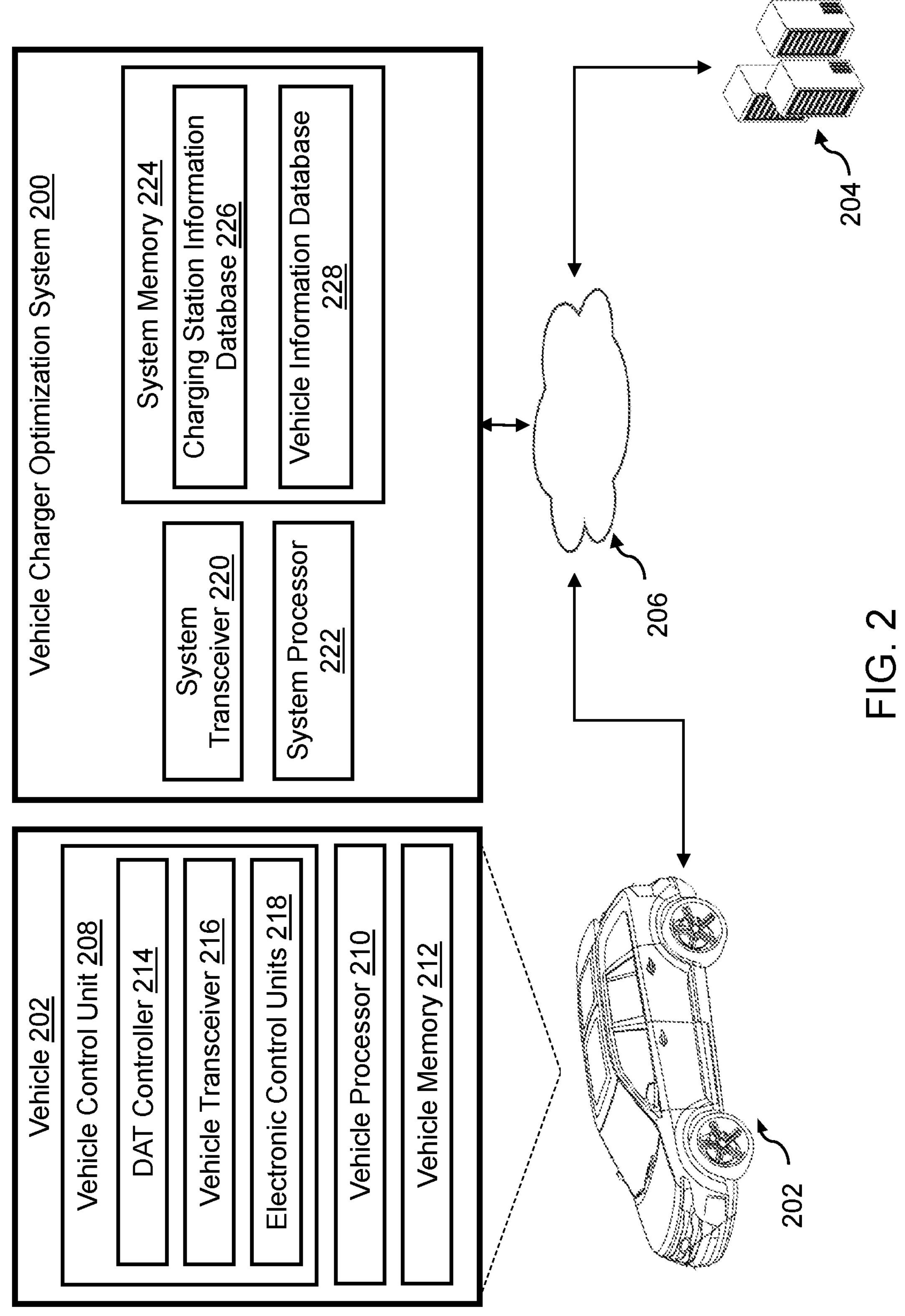
FIG. 2 depicts a block diagram of an example vehicle charger optimization system in accordance with the present disclosure.

FIG. 2 depicts a block diagram of an example vehicle charger optimization system 200 ("system 200") in accordance with the present disclosure. The system 200 may be same as the charger optimization system 125. The system 200, as described herein, can be implemented in hardware, software (e.g., firmware), or a combination thereof. In some aspects, the system 200 may be hosted on a server or a cloud. In other aspects, the system 200 may be part of a distributed computing system.

The system 200 may connect with a vehicle 202 and an external server 204 via a network 206. The network 206 may be same as the network 135, and the external server 204 may be same as the server 140.

The vehicle 202 may be same as the vehicle 105. In some aspects, the vehicle 202 may be include a Battery EV (BEV) driving system or may be configured as an electric vehicle (EV). More particularly, the vehicle 202 may include a battery EV (BEV) drive system or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 202 may be further configured as a fuel cell vehicle (FCV) that converts liquid or solid fuel to usable power using a fuel cell (e.g., a hydrogen fuel cell vehicle (HFCV) powertrain, etc.) and/or any combination of these drive systems and components.

In some aspects, the vehicle 202 may be a manually driven vehicle and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The vehicle 202 may include a plurality of units including, but not limited to, a vehicle control unit (VCU) 208, one or more vehicle processors 210 (or a vehicle processor 210) and a vehicle memory 212 (that may be part of an on-board vehicle computer, not shown), communicatively connected with each other.

The vehicle processor 210 may be disposed in communication with one or more memory devices (e.g., the vehicle memory 212 and/or one or more external databases not shown in FIG. 2). The vehicle processor 210 may utilize the vehicle memory 212 to store programs in code and/or to store data for performing various vehicle 202 operations in accordance with the present disclosure. The vehicle memory 212 may be a non-transitory computer-readable memory. The vehicle memory 212 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 208 may include a plurality of units including, but not limited to, a Driver Assistance Technologies (DAT) controller 214, a vehicle transceiver 216, a plurality of electronic control units (ECUs) 218, and the like. In some aspects, the vehicle transceiver 216 may be outside the VCU 208. The VCU 208 may be configured and/or programmed to coordinate data within vehicle units, connected computing devices (e.g., the server 204) and the system 200 via the network 206.

The DAT controller 214 may provide Level-1 through Level-4 automated driving and driver assistance functionality to a vehicle 202 operator (same as the user 120). One or more ECUs 218 and/or the vehicle processor 210 may be configured to determine charging behavior or real-time charging rate associated with the charging station 110 when the user 120 connects the vehicle 202 to the charging station 110 to charge the vehicle 202. In particular, the vehicle processor 210 may be configured to determine or obtain charging information associated with the charging station 110, such as the real-time charging rate at which the charging station 110 may be charging the vehicle 202. In some aspects, the vehicle processor 210 may determine the real-time charging rate when the charging station 110 performs handshake with the vehicle 202 (e.g., when the user 120 connects the connecting device 115 to the vehicle 202 to initiate vehicle charging). In further aspects, the vehicle processor 210 may be configured to determine or obtain an actual charging time duration for which the vehicle 202 may be charged by using the charging station 110. Stated another way, the vehicle processor 210 may determine the actual charging time duration for which the connecting device 115 may be connected to the vehicle 202. In addition, the vehicle processor 210 may obtain a charging station 110 identifier from the charging station 110 when the vehicle 202 connects to the charging station 110 via the connecting device 115.

In some aspects, the vehicle memory 212 may receive the real-time charging rate and the actual charging time duration determined by the vehicle processor 210 at a predefined frequency, and may store the received information as "charging information" associated with the charging station 110 identifier.

In addition, the vehicle memory 212 may store information associated with vehicle type (e.g., whether the vehicle 202 is Level 1, 2, 3 or 4 autonomous vehicle), vehicle model, vehicle year of manufacture, vehicle battery type (along with other vehicle component type), vehicle battery year of manufacture, and/or the like.

The vehicle transceiver 216 may be configured to obtain the charging information (including the real-time charging rate and the actual charge time duration) associated with charging station 110 (e.g., associated with the charging station 110 identifier), and the vehicle information (including the vehicle and battery type, model, etc.) from the vehicle memory 212. Responsive to obtaining the information, the vehicle transceiver 216 may transmit the charging information and the vehicle information to one or more external systems or servers. For example, the vehicle transceiver 216 may transmit the charging information and the vehicle information to the system 200 via the network 206.

A person ordinarily skilled in the art may appreciate that the vehicle architecture shown in FIG. 2 may omit certain vehicle units and/or vehicle computing modules. It should be readily understood that the vehicle 202 depicted in FIG. 2 is an example of a possible implementation according to the present disclosure, and thus, it should not be considered limiting or exclusive.

Further, although the description above describes that the vehicle transceiver 216 may obtain the charging information and the vehicle information from the vehicle memory 212 and transmit the information to the system 200, a person ordinarily skilled in the art may appreciate that some parts of the charging information and the vehicle information may be obtained from other systems, different from the vehicle 202.

The system 200 may receive/obtain the charging information and the vehicle information from the vehicle transceiver 216. The system 200 may include a plurality of units including, but not limited to, a system transceiver 220, one or more system processors 222 (or a system processor 222) and a system memory 224. The system transceiver 220 may be configured to transmit and receive information to and from the vehicle 202, the server 204, via the network 206. In some aspects, the system transceiver 220 may receive the charging information and the vehicle information from the vehicle transceiver 216. Further, the system transceiver 220 may receive/obtain projected charging rate associated with a plurality of charging stations from the server 204 (as described in conjunction with FIG. 1) or the plurality of charging stations. The projected charging rate may be the "claimed" charging rate, e.g., the charging rate that the charging station 110 may claim or project, as described in conjunction with FIG. 1.

The system processor 222 may be disposed in communication with one or more memory devices, e.g., the system memory 224 and/or one or more external databases (not shown in FIG. 2). The system processor 222 may utilize the system memory 224 to store programs in code and/or to store data for performing various system operations in accordance with the present disclosure. The system memory 224 may be a non-transitory computer-readable memory storing a charger optimization program code. The system memory 224 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the system memory 224 may include a plurality of databases including, but not limited to, a charging station information database 226 and a vehicle information database 228.

The charging station information database 226 may store the projected charging rates associated with the plurality of charging stations (that the system 200 may receive from the server 204, via the system transceiver 220) and respective charger locations. In some aspects, the charging station information database 226 may store the projected charging rates associated with the plurality of charging stations corresponding to or against respective charging station identifiers. A charging station identifier may be a unique identifier that may distinguish one charging station from another. The charging station identifier may be allocated or maintained by the third-party entity associated with the server 204 and may be transmitted to the system 200 by the server 204 along with the projected charging rate information for the plurality of charging stations.

The vehicle information database 228 may store charging information associated with the plurality of charging stations that may be received from respective vehicles. For example, the vehicle information database 228 may store real-time charging rate at which the charging station 110 charges the vehicle 202. In addition, the charging information may include the actual charge time duration for which the vehicle 202 may connect with the charging station 110 to charge the vehicle 202. In some aspects, the vehicle information database 228 may store the charging information corresponding to the charging station identifier. In addition, the vehicle information database 228 may store vehicle information such as vehicle type, vehicle model, battery type, model, etc.

The system processor 222 may be configured to determine charging performance associated with the charging station 110. In particular, the system processor 222 may obtain the projected charging rate associated with the charging station 110 from the charging station information database 226, and the real-time charging rate associated with the charging station 110 from the vehicle information database 228 to determine the charging performance for the charging station 110. The system processor 222 may determine the charging performance by comparing the projected charging rate and the real-time charging rate.

In particular, the system processor 222 may calculate a first difference between the projected charging rate and the real-time charging rate. Responsive to calculating the first difference, the system processor 222 may determine that the first difference between the projected charging rate and the real-time charging rate may be greater than a first predefined threshold (that may be pre-stored in the system memory 224). For example, if the projected charge rate is 150 kW, the real-time charging rate is 110 kW and the first predefined threshold is 5 kW, the system processor 222 may determine that the first difference (i.e., 150−110=40) may be greater than the first predefined threshold. Responsive to a determination that the first difference may be greater than the first predefined threshold, the system processor 222 may perform a predefined action.

The predefined action may be, for example, informing the third-party entity that manages the charging station 110 that the charging station 110 may require repair. Specifically, responsive to the determination that the first difference may be greater than the first predefined threshold, the system processor 222 may transmit, via the system transceiver 220, a notification to the server 204 to report maintenance requirement for the charging station 110. In further aspects, the system processor 222 may transmit notifications to one or more user devices and/or vehicles, indicating the real-time charging rate associated with the charging station 110, via the system transceiver 220. The transmission of notifications to the one or more user devices and/or vehicles may be understood in conjunction with FIG. 3.

In further aspects, the system processor 222 may be configured to determine authenticity associated with the charging station 110. For example, the system processor 222 may determine if the charging station 110 reports/projects more energy transferred to the vehicle 202 than the actual energy transferred. In particular, the system processor 222 may obtain the actual charge time duration and the real-time charging rate from the vehicle information database 228, and calculate the actual energy transferred to the vehicle 105. The system processor 222 may calculate the actual energy transferred by multiplying the actual charge time duration and the real-time charging rate associated with the charging station 110. The system processor 222 may further obtain the projected energy transferred to the vehicle 105 from the charging station 110 via the server 204.

Further, the system processor 222 may determine a second difference between the actual energy and the projected energy. The system processor 222 may additionally determine that the second difference is greater than a second predefined threshold (that may be pre-stored in the system memory 224) and may transmit, via the system transceiver 220, another notification to the server 204 to report fraud or over billing. As described in conjunction with FIG. 1, the system processor 222 may additionally inform the user 120 (via the user device 130) and/or the authorities about the fraud/over-billing.

Although the description above describes that the system processor 222 (or the system 200) obtains the real-time charging rate and the actual charge time duration from the vehicle 202, there may be instances where the user 120 may transmit, via the user device 130, additional information associated with the charging station 110 to the system 200. For example, the user 120 may transmit, via the user device 130, information indicating that the charging station 110 may be out of order, a vehicle may be obstructing the charging station 110 which may make it difficult for other vehicles to charge using the charging station 110, charging station 110 location may be unsafe, and/or the like. The system processor 222 may store the additional information received from the user 120 (and other users associated with the system 200) in the system memory 224 and may transmit (via the system transceiver 220) the additional information to the server 204 and/or the authorities. In this manner, the system 200 may crowdsource information associated with charging station 110 not just from the vehicles connected with the system 200, but also from the users (or user devices) connected with the system 200.

Figure 3:
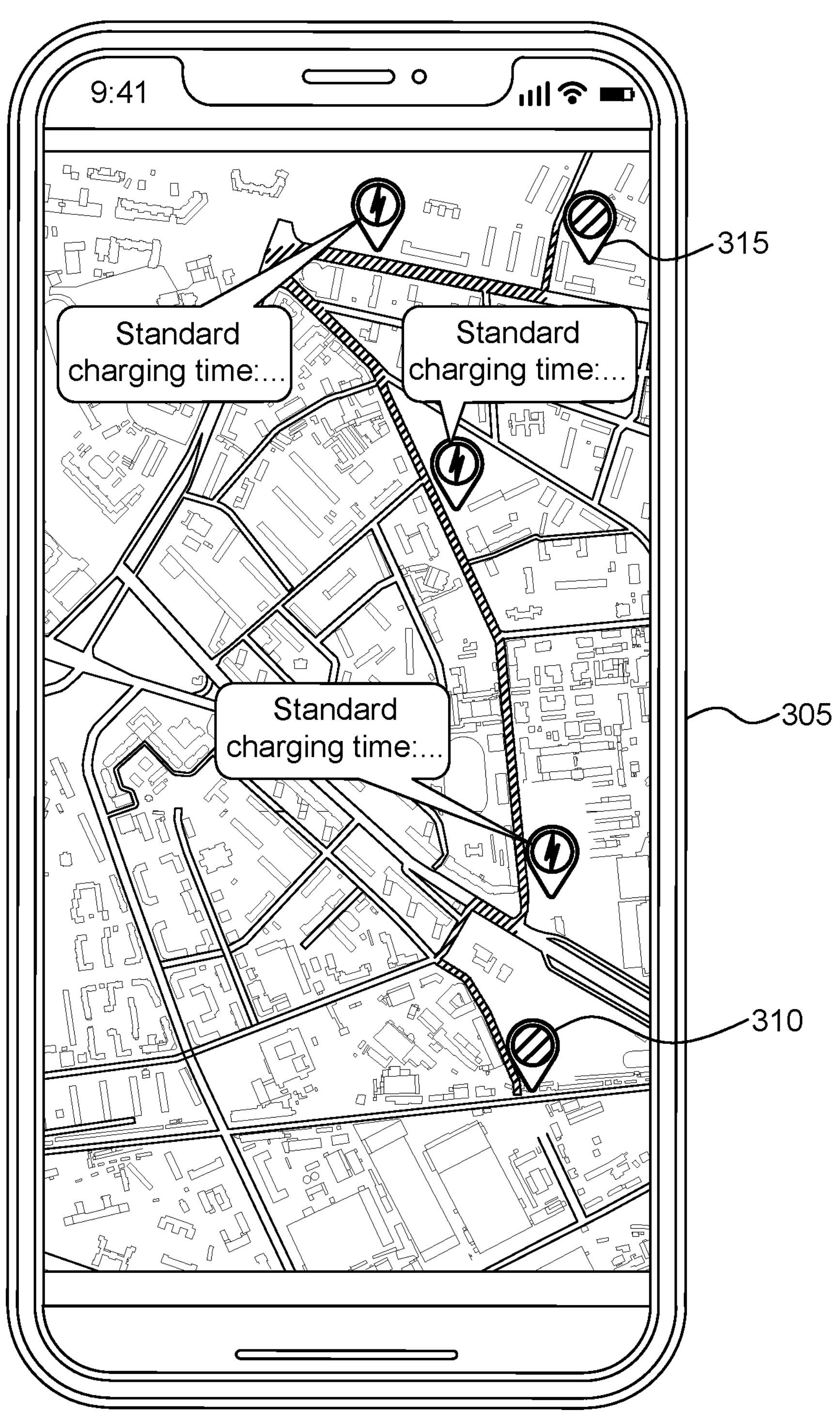
FIG. 3 depicts example snapshots of a user device in accordance with the present disclosure.

In additional aspects, the system processor 222 may be configured to calculate standard or expected charging time associated with the charging station 110 and may transmit the standard charging time to one or more users who may send a request to the system 200 to receive the standard charging time. As described in conjunction with FIG. 1, the system processor 222 may determine the standard charging time duration associated with the charging station 110 for different vehicle types (e.g., the standard charging time duration for Ford™ Mustang™ Mach-E™ may be different from other vehicle types for the same charging station 110) and may store the standard charging time duration in the system memory 224. The use of standard charging time duration may be understood in conjunction with the following example and FIG. 3. Specifically, FIG. 3 depicts example snapshots of a user device 305 in accordance with the present disclosure.

When a user associated with the user device 305 desires to plan a trip from a source location 310 to a destination location 315, the user may send a request, via the user device 305, for charger identification to the system 200 along the route from the source location 310 to the destination location 315. The request may include the source location 310 and the destination location 315. In some aspects, the request may also include a vehicle type of a vehicle owned by the user.

Responsive to receiving the request, the system 200 may fetch locations of one or more chargers from the system memory 224 (in this case, the system memory 224 may pre-store location information for a plurality of chargers that may be located in a geographic area including the source location 310 and the destination location 315). The system 200 may further determine the vehicle type (e.g., Ford™ Mustang™ Mach-E™) of the vehicle owned by the user. Responsive to determining the vehicle type as Ford™ Mustang™ Mach-E™, the system 200 may determine standard charging time durations for each charger of the one or more chargers for the vehicle type Ford™ Mustang™ Mach-E™. The determination of standard charging time durations is already described in conjunction with FIG. 1.

Responsive to determining the standard charging time durations and locations of the one or more chargers, the system 200 may send, via the system transceiver 220, the determined information so that the information may be displayed on a user device 305 display screen. As shown in FIG. 3, the user device 305 may display icons of chargers that the user may use to charge the vehicle, and standard charging time associated with each charger. Since the system 200 determines the standard charging time by using real-time charging rate (and not projected or claimed charging rate), the information provided to the user (or user device 305) is accurate and up-to-date. In an exemplary aspect, the system 200 may also transmit real-time charging rate information to the user device 305, along with the standard charging time.

In further aspects, the system 200 may automatically select a fast charger based on the request. The system 200 may select the fast charger based on the real-time charging rate (and not projected or claimed charging rate). For example, when the system 200 receives the request, the system 200 may analyze charger location and real-time charging rate of each charger (located along the route), correlate the charger location and real-time charging rate, and may select best charger. In some scenarios, the system 200 may select a distant charger to reduce overall trip time (that includes travel time and charging time). In further aspects, the system 200 may be further configured to obtain expected value of charger availability by time (e.g., by the server 204). The system 200 may be further configured to select and/or reserve the charger based on the expected value of charger availability. For example, if the availability of the fast charger "A" is less during evening, the system 200 may not select the fast charger "A" if the user plans to travel in the evening.

In addition, the system 200 may automatically reserve the fast charger based on the selection. For example, the system 200 may automatically reserve the selected charger when the vehicle is nearby. In other aspects, the system 200 may reserve the selected charger at start of the trip based upon the expected time of arrival. In further aspects, the system 200 may dynamically adjust the reservation based on changes in driving behavior.

Figure 4:
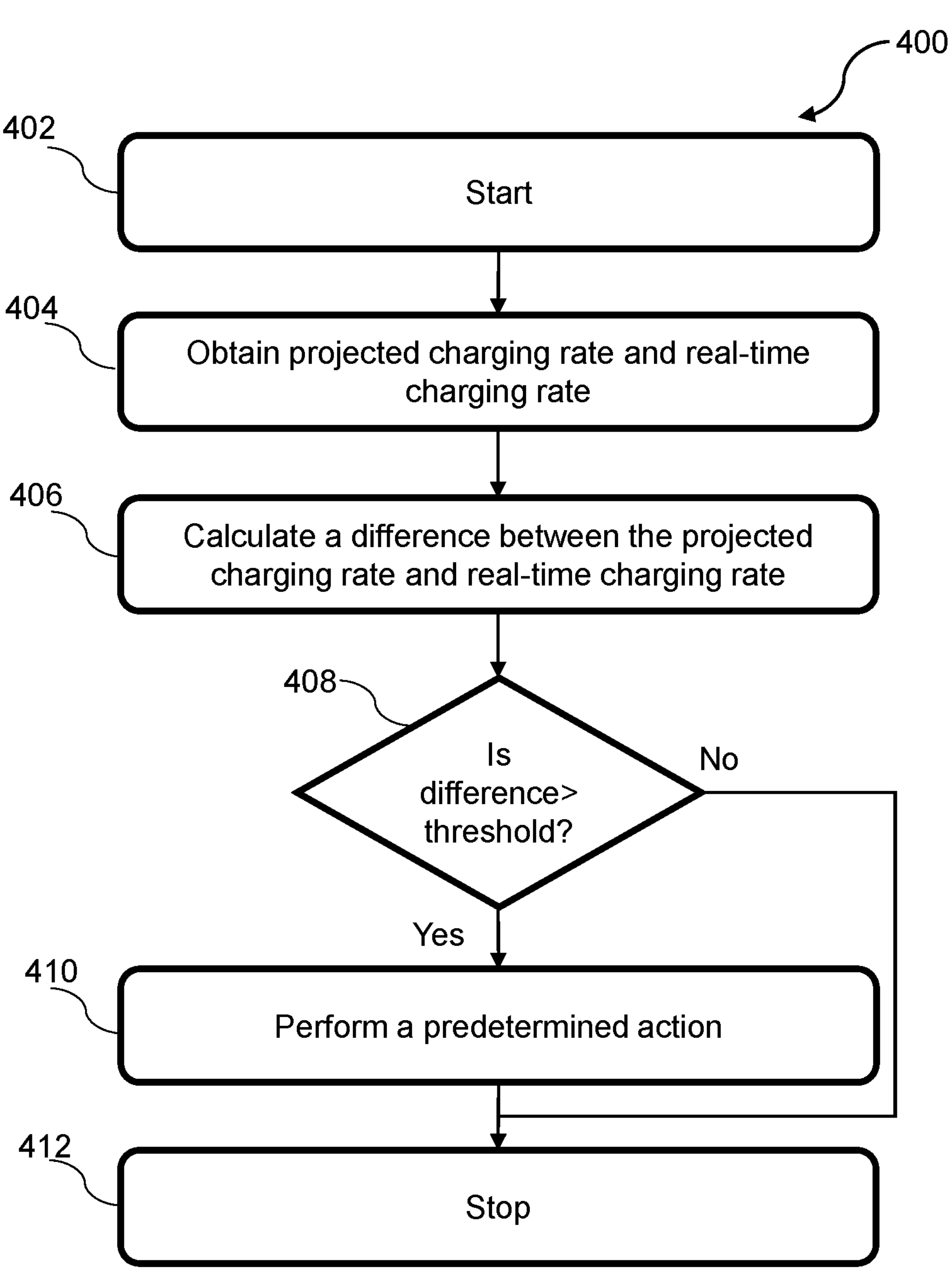
FIG. 4 depicts a flow diagram of an example first method for optimizing vehicle charging time, in accordance with the present disclosure.

FIG. 4 depicts a flow diagram of an example first method 400 for optimizing vehicle charging time, in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include obtaining, by the system processor 222, projected charging rate and real-time charging rate associated with the charging station 110. In particular, the system processor 222 may obtain the projected charging rate directly from the charging station 110 or via the server 204, and may obtain the real-time charging rate from the vehicle 202. The details of the projected charging rate and the real-time charging rate may be understood in conjunction with FIGS. 1-3.

At step 406, the method 400 may include calculating, by the system processor 222, a difference between the projected charging rate and the real-time charging rate. At step 408, the method 400 may include determining, by the system processor 222, whether the difference is greater than a predefined threshold (e.g., a first threshold). Responsive to a determination that the difference is greater than the predefined threshold, the method 400 moves to step 410.

At step 410, the method 400 includes performing, by the system processor 222, a predetermined action. For example, the system processor 222 may transmit a notification to the server 204 to flag charging station 110 maintenance requirement. On the other hand, responsive to a determination that the difference is less than the predefined threshold at step 408, the method 400 moves to step 412.

At step 412, the method 400 may stop.

Figure 5:
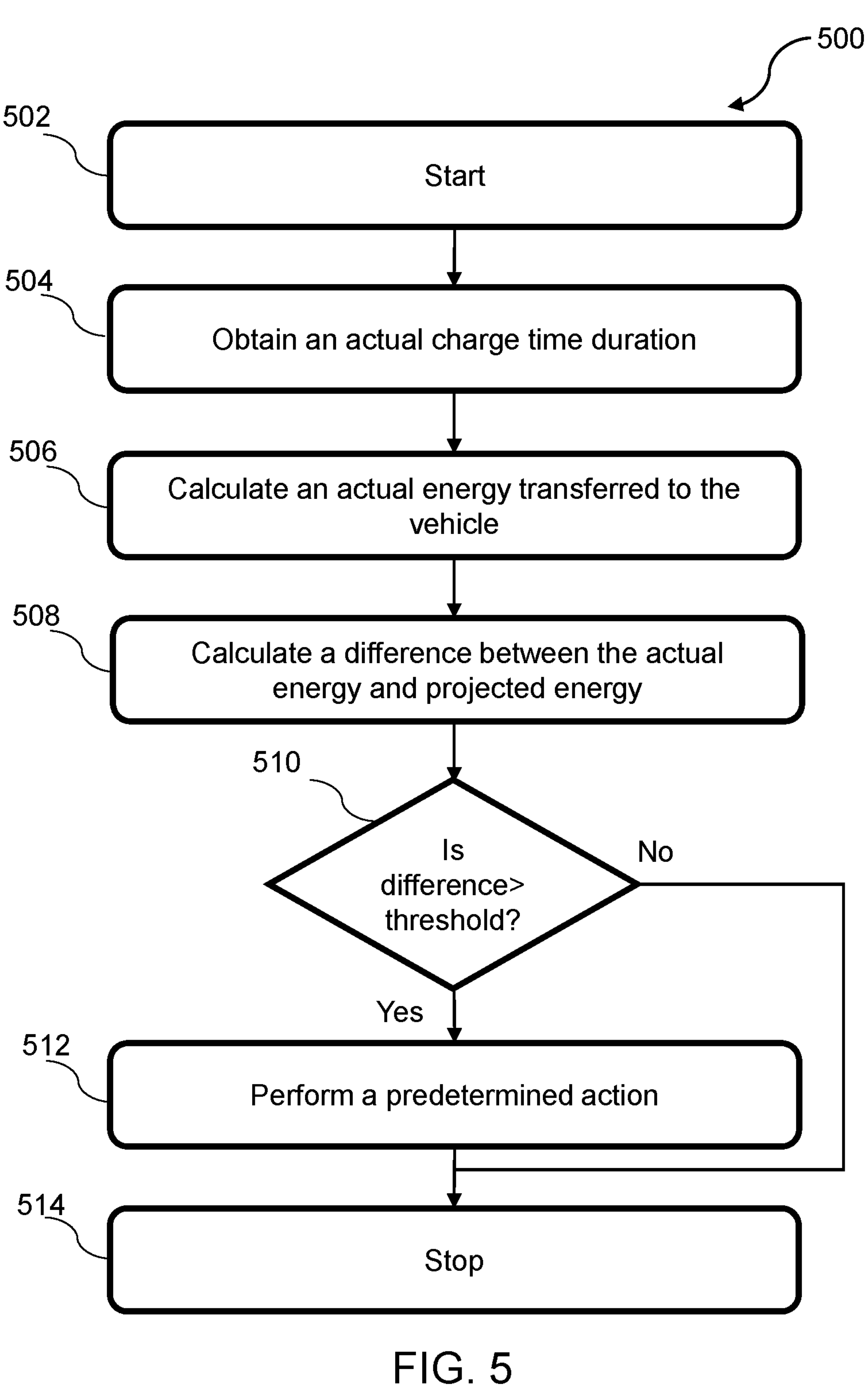
FIG. 5 depicts a flow diagram of an example second method for optimizing vehicle charging time, in accordance with the present disclosure.

FIG. 5 depicts a flow diagram of an example second method 500 for optimizing vehicle charging time, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

At step 502, the method 500 may commence. At step 504, the method 500 may include obtaining, by the system processor 222, an actual charging time duration from the vehicle 202. In addition, the system processor 222 may obtain the real-time charging rate from the vehicle 202 as described in conjunction with FIGS. 1-3. At step 506, the method 500 may include calculating, by the system processor 222, an actual energy transferred to the vehicle 202 based on the actual charging time duration and the real-time charging rate.

At step 508, the method 500 may include calculating, by the system processor 222, a difference between a projected energy transferred and the actual energy transferred. In some aspects, the system processor 222 may obtain the projected energy transferred directly from the charging station 110, or via the server 204. At step 510, the method 500 may include determining, by the system processor 222, whether the difference is greater than a predefined threshold (e.g., a second threshold). Responsive to a determination that the difference is greater than the predefined threshold, the method 500 moves to step 512.

At step 512, the method 500 includes performing, by the system processor 222, a predetermined action. For example, the system processor 222 may transmit a notification to the server 204 to report charging station 110 fraud/over-billing. On the other hand, responsive to a determination that the difference is less than the predefined threshold at the step 510, the method 500 moves to step 514.

At step 514, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:

a transceiver configured to receive charging information;

a memory; and a processor communicatively coupled with the transceiver and the memory, wherein the processor is configured to:

obtain charging information indicating that a vehicle is connected to a charger, the, wherein both the vehicle and the charger are remote from the system;

obtain, from the vehicle, a real-time charging rate at which the vehicle is charged using the charger, wherein the real-time charging rate is determined by the vehicle when the charger performs a handshake with the vehicle upon connection of a connecting device comprising a cable and a cable connector to initiate vehicle charging;

obtain, from a server associated with the charger, a projected charging rate for the charger;

aggregate real-time charging rate data from a plurality of vehicles that have charged using the charger to determine an aggregated real-time charging rate for the charger;

calculate a first difference in charging rate between the projected charging rate and the aggregated real-time charging rate;

determine that the first difference in charging rate is greater than a first predefined threshold; and transmit a maintenance request to the server associated with the charger to flag the charger for repair, based on a determination that the first difference is greater than the first predefined threshold.

2. The system of claim 1, wherein the memory is further configured to store the real-time charging rate associated with the charger.

3. The system of claim 1, wherein the processor is further configured to:

obtain an actual charge time duration from the vehicle; and calculate an actual energy transferred to the vehicle based on the real-time charging rate and the actual charge time duration.

4. The system of claim 3, wherein the processor is further configured to:

obtain a projected energy transferred to the vehicle from the charger;

calculate a second difference between the projected energy and the actual energy;

determine that the second difference is greater than a second predefined threshold; and transmit a notification to a second external server responsive to the second difference being greater than the second predefined threshold.

5. The system of claim 1, wherein the transceiver is further configured to receive vehicle information from the vehicle, and wherein the vehicle information comprises a first vehicle type.

6. The system of claim 5, wherein the processor is further configured to:

obtain the first vehicle type from the transceiver;

calculate an expected charge time duration associated with the first vehicle type and the charger based on the real-time charging rate; and store the expected charge time duration in the memory.

7. The system of claim 6, wherein the processor is further configured to:

obtain a request for a charge time duration associated with the charger from a user device, wherein the request comprises a second vehicle type;

determine that the second vehicle type is same as the first vehicle type;

fetch the expected charge time duration from the memory responsive to the second vehicle type being the same as the first vehicle type; and transmit the expected charge time duration to the user device.

8. A method comprising:

obtaining, by a processor, charging information indicating that a vehicle is connected to a charger, wherein both the vehicle and the charger are remote from the system;

obtaining, from a server associated with the charger, a projected charging rate associated with the charger;

aggregating real-time charging rate data from a plurality of vehicles that have charged using the charger to determine an aggregated real-time charging rate for the charger;

obtaining, from the vehicle, a real-time charging rate at which the vehicle is charged using the charger, wherein the real-time charging rate is determined by the vehicle when the charger performs a handshake with the vehicle upon connection of a connecting device comprising a cable and a cable connector to initiate vehicle charging;

calculating, by the processor, a first difference in charging rate between the projected charging rate and the aggregated real-time charging rate;

determining, by the processor, that the first difference in charging rate is greater than a first predefined threshold; and transmitting, by the processor, a maintenance request to the server associated with the charger to flag the charger for repair, based on a determination that the first difference is greater than the first predefined threshold.

9. The method of claim 8 further comprising storing the real-time charging rate associated with the charger in a memory.

10. The method of claim 8 further comprising:

obtaining an actual charge time duration from the vehicle; and calculating an actual energy transferred to the vehicle based on the real-time charging rate and the actual charge time duration.

11. The method of claim 10 further comprising:

obtaining a projected energy transferred to the vehicle from the charger;

calculating a second difference between the projected energy and the actual energy;

determining that the second difference is greater than a second predefined threshold; and transmitting a notification to a second external server responsive to the second difference being greater than the second predefined threshold.

12. The method of claim 8 further comprising:

obtaining a first vehicle type from the vehicle;

calculating an expected charge time duration associated with the first vehicle type and the charger based on the real-time charging rate; and storing the expected charge time duration in a memory.

13. The method of claim 12 further comprising:

obtaining a request for a charge time duration associated with the charger from a user device, wherein the request comprises a second vehicle type;

determining that the second vehicle type is same as the first vehicle type;

fetching the expected charge time duration from the memory responsive to the second vehicle type being the same as the first vehicle type; and transmitting the expected charge time duration to the user device.

14. A non-transitory computer-readable storage medium having instructions stored thereupon which, when executed by a processor, cause the processor to:

obtain charging information indicating that a vehicle is connected to a charger, wherein both the vehicle and the charger are remote from the system;

obtain, from a server associated with the charger, a projected charging rate associated with a charger;

aggregate real-time charging rate data from a plurality of vehicles that have charged using the charger to determine an aggregated real-time charging rate for the charger;

obtain, from the vehicle, a real-time charging rate at which the vehicle is charged using the charger, wherein the real-time charging rate is determined by the vehicle when the charger performs a handshake with the vehicle upon connection of a connecting device comprising a cable and a cable connector to initiate vehicle charging;

calculate a first difference in charging rate between the projected charging rate and the time aggregated real-time charging rate;

determine that the first difference in charging rate is greater than a first predefined threshold; and transmit a maintenance request to the server associated with the charger to flag the charger for repair, based on a determination that the first difference is greater than the first predefined threshold.

15. The non-transitory computer-readable storage medium of claim 14, wherein performing the predetermined action comprises transmitting notification associated with charger maintenance to a first external server.

16. The non-transitory computer-readable storage medium of claim 14, having further instructions stored thereupon to store the real-time charging rate associated with the charger in a memory.

17. The non-transitory computer-readable storage medium of claim 14, having further instructions stored thereupon to:

obtain an actual charge time duration from the vehicle; and calculate an actual energy transferred to the vehicle based on the real-time charging rate and the actual charge time duration.

18. The non-transitory computer-readable storage medium of claim 17, having further instructions stored thereupon to:

obtain a projected energy transferred to the vehicle from the charger;

calculate a second difference between the projected energy and the actual energy;

determine that the second difference is greater than a second predefined threshold; and transmit a notification to a second external server responsive to the second difference being greater than the second predefined threshold.

* * * * *